Dec. 6, 1966 E. SCHÜLLER 3,289,906

CAPSTAN AND PRESSURE SHOE

Filed Feb. 13, 1964

INVENTOR
Eduard Schüller
BY Spencer & Kaye
ATTORNEYS

United States Patent Office 3,289,906
Patented Dec. 6, 1966

3,289,906
CAPSTAN AND PRESSURE SHOE

Eduard Schüller, Wedel, Holstein, Germany, assignor to Telefunken Patentverwertungs-G.m.b.H., Ulm (Danube), Germany Filed Feb. 13, 1964, Ser. No. 344,696
Claims priority, application Germany, Feb. 13, 1963, T 23,463
7 Claims. (Cl. 226—168)

The present invention relates to a drive for a band-shaped record carrier, e.g., the tape of a magnetic tape recorder or the like.

Conventionally, the transport means or drive for the magnetic tape of a tape recorder or the like comprise a rubber roller which is mounted on a pivotable lever, this lever being interconnected with the "record" and "play-back" control organ such that the roller presses the tape against the actual driving element, or capstan, generally consisting of a steel shaft.

It is a primary object of the present invention to provide a drive which is simpler than the above-described tape drive and, with this object in view, the present invention resides in a drive arrangement in which the means for pressing the tape against the actual driving organ are constituted by a fixed, i.e., non-rotatable, shoe which is made of a material which, with reference to the back of the tape, has a low coefficient of friction, while the actual driving organ, e.g., the drive shaft or capstan, has a surface which, with reference to the front of the tape, i.e., the side presenting the magnetic layer, has a high coefficient of friction. In accordance with the present invention, the peripheral surface of high coefficient of friction is constituted by a driving belt for rotating the capstan, which driving belt loops about the capstan at the same level as that at which the capstan is engaged by the tape.

By virtue of the above arrangement, one of the rotating parts, heretofore considered indispensable, is eliminated. Also eliminated are the troubles which, in prior art drives, sometimes result from inaccurately mounting the rubber counterpressure roller, as well as from the striking of the roller against the tape.

Additional objects and advantages of the present invention will become apparent upon consideration of the following description when taken in conjunction with the accompanying drawings in which.

Figure 1:
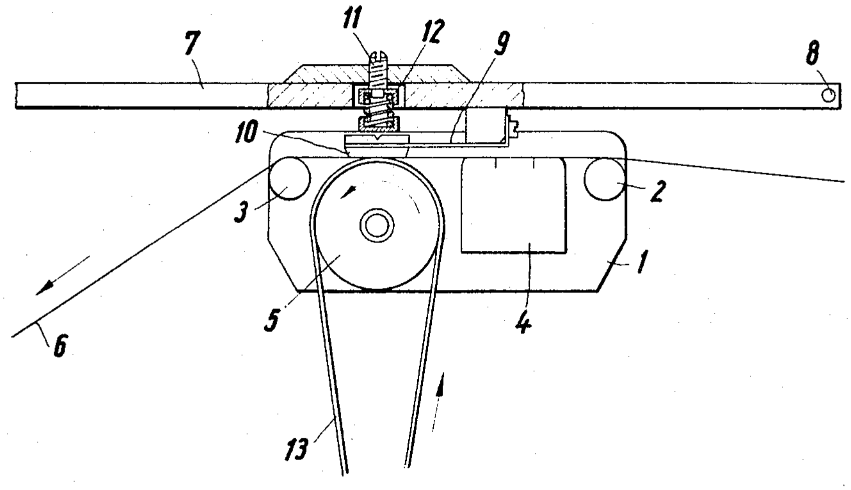
FIGURE 1 is a plan view, partly in section, of a tape drive arrangement according to the present invention.

Referring now to the drawing and FIGURE 1 thereof in particular, the same shows the deck 1 of a tape recorder which is mounted on the chassis of the apparatus. This mounting is conventional and therefore not shown. The deck 1 carries the tape guide rollers 2 and 3 as well as a magnetic recording and playback head 4 and the driving shaft or capstan 5. The latter is mechanically coupled to a suitable constant-speed drive motor (not shown), as is conventional in the tape recorder art, so that the tape 6 is advanced at a constant speed. Arranged in front of the deck 1 is a lever 7 which is pivotable about a horizontal, or, as shown, a vertical axis 8. The lever 7 carries a leaf spring 9 which lies in a plane parallel to the tape and which carries at its free end a non-rotatable shoe 10. With the parts occupying the position shown in FIGURE 1, the shoe 10 presses the tape 6 against the capstan. The lever 7 also carries, behind the shoe 10, a threaded screw 11 by means of which the force exerted by a spring 12, interposed between the shoe 10 and the lever 7, can be adjusted. In this way, the force with which the shoe 10 presses the tape against the capstan can be regulated. By virtue of the leaf spring 9, the line or surface along which contact is made between the tape 6 and the capstan 5 is parallel to the axis of the capstan.

The shoe 10 is made of a material having a very low coefficient of friction, while the outer periphery of the capstan 5 has a large coefficient of friction. The shoe 10 slides against the smooth back of the tape, while the capstan 5 faces that side of the tape which has the magnetic coating, this last-mentioned side of the tape being rougher than the smooth back of the tape. As a result, the tape will be certain to be carried along by the capstan 5; on the other hand, the shoe 10 will produce but a very slight drag on the tape.

In practice, the shoe 10 will be made of a substantially wear-proof or wear-resistant plastic, e.g., a polyamide such as nylon. A high coefficient of friction between the capstan 5 and the tape 6 may be achieved, as shown in FIGURE 1, by using the flat drive belt 13 which rotates the capstan. Accordingly, the drive belt 13 will be arranged so as to be, on the capstan, in axial alignment with the tape 6, i.e., the belt 13 is looped about the capstan 5 at the same level as that at which the tape 6 engages the capstan.

Figure 2:
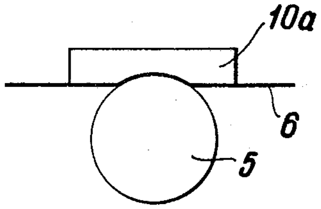
FIGURE 2 is a fragmentary plan view, similar to FIGURE 1 but showing a modification of the shoe for pressing the tape against the capstan.

In the arrangement shown in FIGURE 1, the smooth undersurface of shoe 10 is planar and extends parallel to the tape. However, in order to keep the specific pressure on the tape 6 (i.e., force per unit area) relatively low, it is expedient to curve the underside of the shoe so as to form a concave engaging surface in the region where the shoe engages the tape 6, and to make this curvature of the shoe 10*a*, as shown on an exaggerated scale in FIGURE 2, equal to the curvature of the capstan 5.

The term "tape recorder," as used throughout the instant specification and claims, is intended to comprehend any piece of equipment which makes use of a tape-like record carrier.

It will be understood that the above description of the present invention is susceptible to various modifications, changes, and adaptations, and the same are intended to be comprehended within the meaning and range of equivalents of the appended claims.

What is claimed is:

1. In a tape recorder, a drive arrangement for a magnetic tape having a front whereat the magnetic layer is provided and a back, said drive arrangement comprising a capstan and a non-rotatable shoe for pressing the tape against said capstan, said shoe engaging the back of the tape and said capstan engaging the front of the tape, said shoe being made of a material which, with reference to the back of the tape, has a low coefficient of friction, thereby to exert a low drag on the tape, and said capstan having a peripheral surface which, with reference to the front of the tape, has a high coefficient of friction, thereby to ensure that, when the tape is pressed against said capstan by said shoe, the tape is moved at a speed equal to the peripheral speed of said capstan, and a driving belt for rotating said capstan, said driving belt looping about said capstan at the same level as that at which said capstan is engaged by the tape, said belt constituting said peripheral surface of high coefficient of friction.

2. The combination defined in claim 1 wherein said shoe has an engaging surface which, when said shoe presses the tape against said belt looping about said capstan, is in contact with the back of the tape, said engaging surface being substantially planar.

3. The combination defined in claim 1 wherein said shoe has an engaging surface which, when said shoe presses the tape against said belt looping about said capstan, is in contact with the back of the tape, said engaging surface being concavely curved and having a radius of curvature substantially equal to the curvature of said capstan, thereby to reduce the specific pressure exerted on the tape.

4. The combination defined in claim 1 wherein said shoe is made of a substantially wear-proof material.

5. The combination defined in claim 1, further comprising a support for said shoe, said support including a leaf spring carrying, at one end thereof, said shoe.

6. The combination defined in claim 5 wherein said support for said shoe further includes a lever which is mounted for pivotal movement with respect to said capstan, said lever carrying said leaf spring such that said shoe is free of said lever.

7. The combination defined in claim 6 wherein said support for said shoe further includes adjustable spring means interposed between said lever and said shoe, thereby to permit adjustment in the force with which said shoe presses the tape against said capstan.

References Cited by the Examiner

UNITED STATES PATENTS

| | | | |
|---|---|---|---|
| 2,096,113 | 10/1937 | Kiel | 226—199 X |
| 2,153,214 | 4/1939 | Tondreau | 226—183 X |
| 2,272,323 | 2/1942 | Lawrence | 226—171 |
| 2,276,494 | 3/1942 | Kellogg | 226—187 |
| 2,539,858 | 1/1951 | Offutt | 274—4 |
| 2,998,177 | 8/1961 | Romano | 226—196 X |
| 3,042,281 | 7/1962 | Balvin | 226—181 |
| 3,141,593 | 7/1964 | Selsted | 226—176 X |

M. HENSON WOOD, Jr., *Primary Examiner.*

ROBERT B. REEVES, *Examiner.*

R. A. SCHACHER, *Assistant Examiner.*